US012103806B2

(12) United States Patent
Uchibori et al.

(10) Patent No.: US 12,103,806 B2
(45) Date of Patent: Oct. 1, 2024

(54) POST-PROCESSING DEVICE, PRINTING SYSTEM, AND CONTROLLING METHOD OF POST-PROCESSING DEVICE

(71) Applicant: SEIKO EPSON CORPORATION, Tokyo (JP)

(72) Inventors: Kenji Uchibori, Shiojiri (JP); Masaki Miyazawa, Matsumoto (JP); Kazuyoshi Ohashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/162,552

(22) Filed: Jan. 31, 2023

(65) Prior Publication Data

US 2023/0249938 A1 Aug. 10, 2023

(30) Foreign Application Priority Data

Feb. 1, 2022 (JP) ................................ 2022-014032

(51) Int. Cl.
*B41J 13/00* (2006.01)
*B65H 29/00* (2006.01)
*B65H 29/20* (2006.01)
*B65H 43/00* (2006.01)

(52) U.S. Cl.
CPC .......... *B65H 43/00* (2013.01); *B41J 13/0009* (2013.01); *B65H 29/001* (2013.01); *B65H 29/20* (2013.01); *B65H 2515/40* (2013.01); *B65H 2515/805* (2013.01); *B65H 2801/27* (2013.01)

(58) Field of Classification Search
CPC ........... B65H 2220/11; B65H 2220/02; B65H 2511/30; B65H 29/20; B65H 43/00; B65H 2515/805; B65H 2801/27; B65H 2515/40; B65H 29/001; B41J 13/0009
See application file for complete search history.

(56) References Cited

U.S. PATENT DOCUMENTS

2007/0045925 A1* 3/2007 Moriyama ......... B65H 31/3027 270/58.07
2018/0265323 A1 9/2018 Kim
2023/0183032 A1* 6/2023 Oguchi .................. B65H 31/36 271/221

FOREIGN PATENT DOCUMENTS

JP 2018-154413 A 10/2018

* cited by examiner

*Primary Examiner* — Jennifer Bahls
(74) *Attorney, Agent, or Firm* — WORKMAN NYDEGGER

(57) ABSTRACT

A post-processing device includes a loading unit on which a sheet is loaded, a first transport unit configured to apply, to the sheet loaded on the loading unit, a transport force toward an alignment unit, a second transport unit located between the first transport unit and the alignment unit, and configured to apply, to the sheet, a transport force toward the alignment unit, a control unit configured to control rotation operation of the second transport unit, and a post-processing unit configured to perform post-processing on the sheet transported to the alignment unit, wherein the post-processing unit is configured to execute a plurality of types of the post-processing, and the control unit is configured to control the rotation operation of the second transport unit in accordance with the type of the post-processing.

8 Claims, 8 Drawing Sheets

(A)

| | | FIRST PADDLE ROTATION NUMBER [TIMES] | SECOND PADDLE ROTATION NUMBER [TIMES] |
|---|---|---|---|
| POST-PROCESSING | ROD STACK | 1 | 3 |
| | SHIFT | 1 | 3 |
| | STAPLE | 2 | 4 |

(B)

| | | FIRST PADDLE ROTATION NUMBER [TIMES] | SECOND PADDLE ROTATION NUMBER [TIMES] |
|---|---|---|---|
| POST-PROCESSING | ROD STACK | 1 | 0 |
| | SHIFT | 1 | 0 |
| | STAPLE | 2 | 4 |

FIG. 2

(A)

| | | FIRST PADDLE ROTATION NUMBER [TIMES] | SECOND PADDLE ROTATION NUMBER [TIMES] |
|---|---|---|---|
| POST-PROCESSING | ROD STACK | 1 | 3 |
| | SHIFT | 1 | 3 |
| | STAPLE | 2 | 4 |

⇩

(B)

| | | FIRST PADDLE ROTATION NUMBER [TIMES] | SECOND PADDLE ROTATION NUMBER [TIMES] |
|---|---|---|---|
| POST-PROCESSING | ROD STACK | 1 | 1 |
| | SHIFT | 1 | 1 |
| | STAPLE | 2 | 4 |

FIG. 4

(A)

| | | FIRST PADDLE ROTATION NUMBER [TIMES] | SECOND PADDLE ROTATION NUMBER [TIMES] |
|---|---|---|---|
| POST-PROCESSING | ROD STACK | 1 | 0 |
| | SHIFT | 1 | 0 |

(B)

| | | FIRST PADDLE ROTATION NUMBER [TIMES] | SECOND PADDLE ROTATION NUMBER [TIMES] |
|---|---|---|---|
| POST-PROCESSING | ROD STACK | 1 | 2 |
| | SHIFT | 1 | 2 |

(C)

| | | FIRST PADDLE ROTATION NUMBER [TIMES] | SECOND PADDLE ROTATION NUMBER [TIMES] |
|---|---|---|---|
| POST-PROCESSING | STAPLE | 2 | 4 |

FIG. 6

| SECOND PADDLE ROTATION NUMBER [TIMES] *WHEN ROD STACK OR SHIFT IS SELECTED | | | | | | | | | | | | |
|---|---|---|---|---|---|---|---|---|---|---|---|---|
| ENVIRONMENT | ENVIRONMENT A | | | | ENVIRONMENT B | | | | ENVIRONMENT C | | | |
| PRINTING DENSITY \ SIZE | ~297mm | ~363mm | ~432mm | GREATER THAN 432 | ~297mm | ~363mm | ~432mm | GREATER THAN 432 | ~297mm | ~363mm | ~432mm | GREATER THAN 432 |
| 0-10 | 0 | 0 | 0 | 0 | 0 | 0 | 0 | 0 | 0 | 0 | 0 | 2 |
| 10-20 | 0 | 0 | 0 | 0 | 0 | 0 | 0 | 0 | 0 | 0 | 2 | 2 |
| 20-30 | 0 | 0 | 0 | 0 | 0 | 0 | 0 | 2 | 0 | 2 | 2 | 2 |
| 30-40 | 0 | 0 | 0 | 0 | 0 | 0 | 2 | 2 | 2 | 2 | 2 | 3 |
| 40-50 | 0 | 0 | 0 | 2 | 0 | 2 | 2 | 2 | 2 | 2 | 3 | 3 |
| 50-60 | 0 | 0 | 2 | 2 | 2 | 2 | 2 | 3 | 2 | 3 | 3 | 3 |
| 60-70 | 0 | 2 | 2 | 2 | 2 | 2 | 3 | 3 | 3 | 3 | 3 | 3 |
| 70-80 | 2 | 2 | 2 | 3 | 2 | 3 | 3 | 3 | 3 | 3 | 3 | 3 |
| 80-90 | 2 | 2 | 3 | 3 | 3 | 3 | 3 | 3 | 3 | 3 | 3 | 3 |
| 90-100 | 2 | 3 | 3 | 3 | 3 | 3 | 3 | 3 | 3 | 3 | 3 | 3 |

FIG. 7

POST-PROCESSING DEVICE, PRINTING SYSTEM, AND CONTROLLING METHOD OF POST-PROCESSING DEVICE

The present application is based on, and claims priority from JP Application Serial Number 2022-014032, filed Feb. 1, 2022, the disclosure of which is hereby incorporated by reference herein in its entirety.

BACKGROUND

1. Technical Field

The present disclosure relates to a post-processing device, a printing system, and a control method of the post-processing device.

2. Related Art

An example of such a post-processing device is disclosed in JP-A-2018-154413. JP-A-2018-154413 describes a post-processing device including a sheet transport apparatus that transports a sheet to a predetermined position by rotating a paddle as a transport unit that transports a discharged sheet in a predetermined direction.

The paddle as the transport unit is made of a rubber material, etc. having flexibility, but there is a problem that when the paddle is continuously used, a transport force with respect to the sheet is gradually reduced due to wear and deterioration. In JP-A-2018-154413, there is no description to consider this feature.

SUMMARY

To solve the above problem, a post-processing device according to the present disclosure includes a loading unit on which a sheet to be fed is loaded, a first transport unit configured to apply, to the sheet loaded on the loading unit, a transport force toward an alignment unit, a second transport unit located between the first transport unit and the alignment unit, and configured to apply, to the sheet, a transport force toward the alignment unit, a control unit configured to control rotation operation of the second transport unit, and a post-processing unit configured to perform post-processing on the sheet transported to the alignment unit, wherein the post-processing unit is configured to execute a plurality of types of the post-processing, and the control unit is configured to control the rotation operation of the second transport unit in accordance with the type of the post-processing.

A printing system according to the present disclosure includes a printing apparatus configured to perform printing on a sheet, the foregoing post-processing device to which the sheet on which printing is performed by the printing apparatus is fed, wherein the printing system includes a discharged sheet receiving unit configured to receive a sheet discharged through the post-processing unit of the post-processing device and receive both of a sheet subjected to the post-processing and a sheet not subjected to the post-processing.

A control method of a post-processing device according to the present disclosure is a control method of a post-processing device including a loading unit on which a sheet to be fed is loaded, a first transport unit configured to apply, to the sheet loaded on the loading unit, a transport force toward an alignment unit, a second transport unit located between the first transport unit and the alignment unit, and configured to apply, to the sheet, a transport force toward the alignment unit, a control unit configured to control rotation operation of the second transport unit, and a post-processing unit configured to perform post-processing on the sheet transported to the alignment unit and execute a plurality of types of post-processing, the method including switching a rotation number of the second transport unit in accordance with the type of the post-processing.

BRIEF DESCRIPTION OF THE DRAWINGS

FIG. 2 is an example of a table used for rotation control of a second transport unit according to the first exemplary embodiment.

FIG. 4 is another example of a table used for rotation control of the second transport unit according to the first exemplary embodiment.

FIG. 6 is an example of a table used for rotation control of the second transport unit corresponding to FIG. 5.

FIG. 7 is another example of a table used for rotation control of the second transport unit according to the first exemplary embodiment.

DESCRIPTION OF EXEMPLARY EMBODIMENTS

Figure 1:
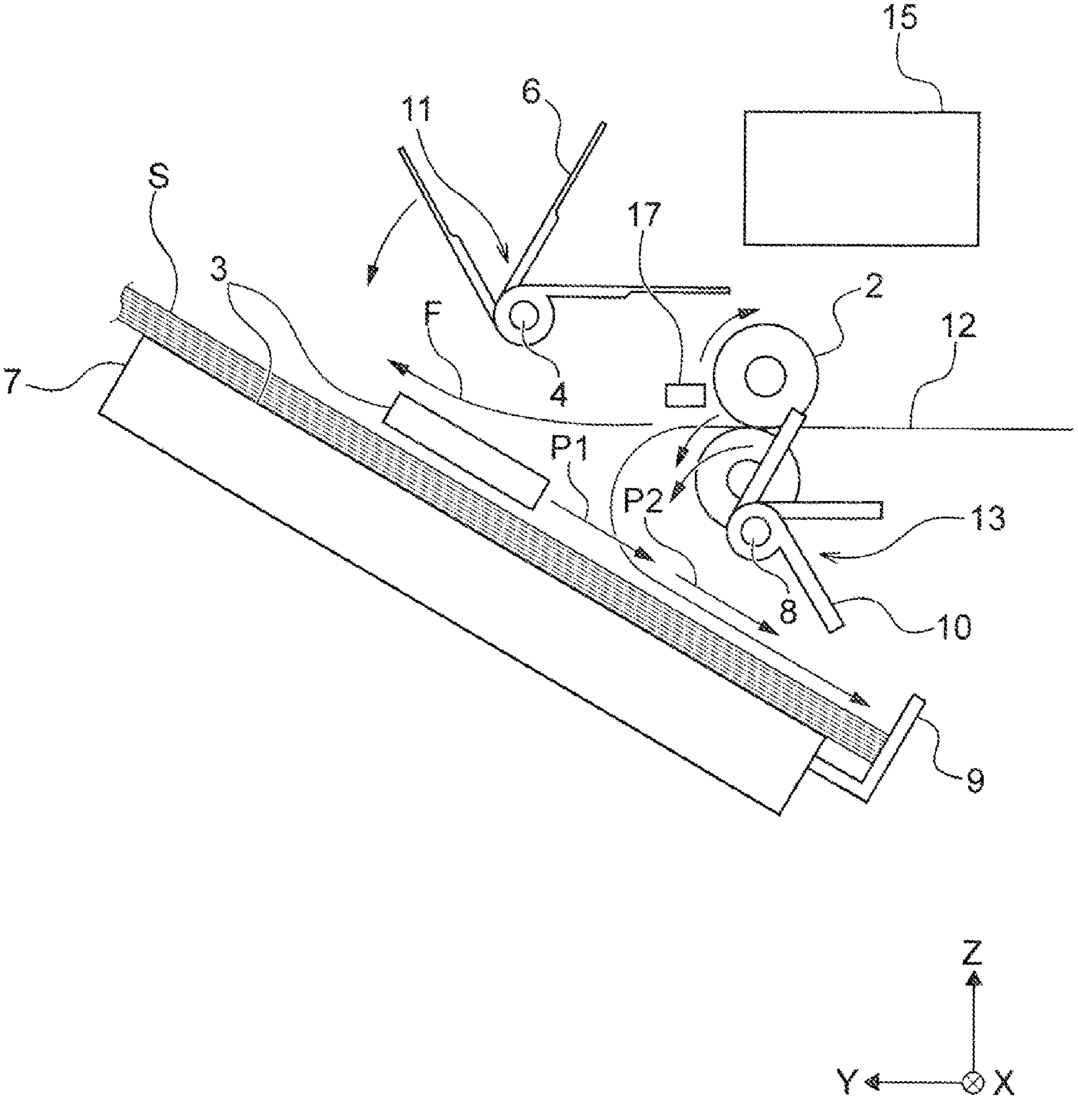
FIG. 1 is a schematic configuration diagram of a main part of a post-processing device according to a first exemplary embodiment.

Hereinafter, the present disclosure will be schematically described first.

To solve the above problem, a post-processing device according to a first aspect of the present disclosure includes a loading unit on which a sheet to be fed is loaded, a first transport unit configured to apply, to the sheet loaded on the loading unit, a transport force toward an alignment unit, a second transport unit located between the first transport unit and the alignment unit, and configured to apply, to the sheet, a transport force toward the alignment unit, a control unit configured to control rotation operation of the second transport unit, and a post-processing unit configured to perform post-processing on the sheet transported to the alignment unit, wherein the post-processing unit is configured to execute a plurality of types of the post-processing, and the control unit is configured to control the rotation operation of the second transport unit in accordance with the type of the post-processing.

The post-processing includes a type in which a sheet alignment standard is strict, such as staple processing described below, and a type in which the sheet alignment standard is not so strict. For the type of post-processing in which the alignment standard is not strict, there is no problem even when a transport force by a second transport unit is reduced.

In this aspect, the control unit controls rotation operation of the second transport unit in accordance with the type of the post-processing. That is, it is possible to reduce a rotation number of the second transport unit in accordance with the type of the post-processing, instead of making the rotation number uniform As a result, it is possible to suppress the progress of the wear in comparison with a case where the second transport unit is uniformly rotated.

In the post-processing device according to a second aspect of the present disclosure, in the first aspect, the post-processing is rod stack processing, shift processing, or staple processing.

Here, the "rod stack processing" means a process of sequentially stacking sheets, which are aligned by being transported to the alignment unit, on the loading unit as they are.

Further, the "shift processing" means a process of shifting a bundle of a predetermined number of the aligned sheets in a width direction to shift and position each bundle.

In addition, the "staple processing" means a process of binding the bundle of the predetermined number of the aligned sheets with a staple, and is a process having a stricter alignment standard than that of the rod stack processing or the shift processing.

The alignment standards for the rod stack processing and the shift processing as the post-processing are not strict. On the other hand, the alignment standard of the staple processing is strict.

According to this aspect, since the control unit controls the rotation operation of the second transport unit in accordance with the type of the post-processing, such a post-processing device capable of selecting and executing a plurality of types of the post-processing has a great effect.

In the post-processing device according to a third aspect of the present disclosure, in the second aspect, the control unit is configured to, when the rod stack processing or the shift processing is selected, cause a rotation number in the rotation operation of the second transport unit to be less than the rotation number in a case of the staple processing.

Here, "reduce" in "reduce a rotation number" is used in a meaning including not only literally reducing the rotation number but also setting the rotation number to 0, in other words, not rotating.

According to this aspect, in a case where the rod stack processing or the shift processing in which the alignment standard is not strict is selected, it is possible to cause the rotation number of the second transport unit to be less than that in the staple processing in which the alignment standard is strict. Accordingly, it is possible to suppress the progress of wear of the second transport unit.

The post-processing device according to a fourth aspect of the present disclosure, in the second or third aspect, further includes a counting unit configured to count a total transport number of sheets transported to the alignment unit, wherein the control unit is configured to, when the rod stack processing or the shift processing is selected and the total transport number is equal to or greater than a predetermined number, cause a rotation number in the rotation operation of the second transport unit to be greater than the rotation number in a case where the total transport number is less than the predetermined number.

Since wear of the second transport unit progresses due to continuous use, the transport force gradually decreases if the rotation number of the second transport unit is uniform. The total transport number of the sheets counted by the counting unit is information corresponding to a degree of wear due to the continuous use.

According to this aspect, in a case where the total transport number is equal to or greater than the predetermined number, it is possible to cause the rotation number in the rotation operation of the second transport unit to be greater than the rotation number in a case where the total transport number is less than the predetermined number. By increasing the rotation number in this manner, it is possible to compensate for a decrease in the transport force due to the wear.

In the post-processing device according to a fifth aspect of the present disclosure, in the fourth aspect, the control unit is configured to not perform the rotation operation of the second transport unit, when the rod stack processing or the shift processing is selected, the total transport number is equal to or greater than the predetermined number, and at least one of the following (1) to (4) is satisfied:

(1) a basis weight of the sheet is less than a predetermined amount;

(2) a size of the sheet is smaller than a predetermined size;

(3) a humidity is lower than a predetermined value or a temperature is higher than a predetermined value; and (4) a printing density in a case where printing is performed on the sheet is lower than a predetermined value.

Here, the "basis weight" refers to a weight (g) of a sheet of 1 m×1 m. The "printing density" is an ejection amount of ink ejected per unit area and is also referred to as a duty.

(1) Since the sheet is light when the basis weight of the sheet is less than the predetermined amount, the sheet can be transported only by the first transport unit without rotating the second transport unit. The "predetermined amount" is set depending on whether the sheet can be transported only by the first transport unit without rotating the second transport unit.

(2) Since the sheet is light when the size of the sheet is smaller than the predetermined size, the sheet can be transported only by the first transport unit without rotating the second transport unit. The "predetermined size" is set depending on whether the sheet can be transported only by the first transport unit without rotating the second transport unit.

(3) Since the sheet is dried when the humidity is lower than the predetermined value, the sheet can be transported only by the first transport unit without rotating the second transport unit. The "predetermined value" is set depending on whether the sheet can be transported only by the first transport unit without rotating the second transport unit.

Further, since the material of the first transport unit and the second transport unit is usually rubber, the material is hard to be cured and the transport force is not reduced when the temperature is higher than the predetermined value. Therefore, the sheet can be transported only by the first transport unit without rotating the second transport unit. The "predetermined amount" is set depending on whether the sheet can be transported only by the first transport unit without rotating the second transport unit.

(4) When the printing density in a case where printing is performed on the sheet is lower than the predetermined value, the friction between the sheets is small. Therefore, the sheet can be transported only by the first transport unit without rotating the second transport unit. The "predetermined value" is set depending on whether the sheet can be transported only by the first transport unit without rotating the second transport unit.

According to this aspect, in a case where at least one of the above (1) to (4) is satisfied, it is possible not to perform the rotation operation of the second transport unit. Accordingly, it is possible to suppress the progress of wear of the second transport unit.

In the post-processing device according to a sixth aspect of the present disclosure, in any one of the first to fifth aspects, the first transport unit includes a separation mechanism configured to separate the first transport unit from a sheet loading surface of the loading unit, and a position of the second transport unit with respect to the sheet loading surface is fixed.

Since the first transport unit can be separated from the sheet loading surface of the loading unit, it is possible to suppress the progress of wear of the first transport unit. However, since the position of the second transport unit is fixed, it is difficult to structurally suppress the progress of wear of the second transport unit.

When the present disclosure is provided to a post-processing device including such a second transport unit whose position is fixed, the effect thereof is large.

A printing system according to a seventh aspect of the present disclosure includes a printing apparatus configured to perform printing on a sheet, the foregoing post-processing device according to any one of the first to sixth aspects, to which the sheet on which printing is performed by the printing apparatus is fed, wherein the printing system includes a discharged sheet receiving unit configured to receive a sheet discharged through the post-processing unit of the post-processing device and receive both of a sheet subjected to the post-processing and a sheet not subjected to the post-processing.

As in the printing system having a structure where the discharged sheet receiving unit for receiving the sheet discharged through the post-processing unit of the post-processing device is provided and the discharged sheet receiving unit receives both of a sheet subjected to the post-processing and a sheet not subjected to the post-processing, the second transport unit applies the transport force also to the sheet not subjected to the post-processing. In the printing system having such a structure, it is difficult to suppress the progress of wear of the second transport unit.

According to this aspect, since the post-processing device to which the sheet on which printing is performed by the printing apparatus is fed is the post-processing device according to any one of the first to sixth aspects, it is possible to suppress the progress of wear of the second transport unit.

A control method of a post-processing device according to an eighth aspect of the present disclosure is a control method of a post-processing device including a loading unit on which a sheet to be fed is loaded, a first transport unit configured to apply, to the sheet loaded on the loading unit, a transport force toward an alignment unit, a second transport unit located between the first transport unit and the alignment unit, and configured to apply, to the sheet, a transport force toward the alignment unit, a control unit configured to control rotation operation of the second transport unit, and a post-processing unit configured to perform post-processing on the sheet transported to the alignment unit and execute a plurality of types of post-processing, the method including switching a rotation number of the second transport unit in accordance with the type of the post-processing by the control unit.

According to this aspect, it is possible to obtain the same effect as the effect obtained by the post-processing device according to any one of the first to sixth aspects.

First Exemplary Embodiment

Hereinafter, a post-processing device and a printing system including the same according to a first exemplary embodiment will be specifically described with reference to FIGS. 1 to 8.

In the following description, three axes orthogonal to each other are referred to as an X-axis, a Y-axis, and a Z-axis, as illustrated in the drawings. The Z-axis direction corresponds to a vertical direction, that is, a direction in which gravity acts. The X-axis direction and the Y-axis direction correspond to the horizontal direction. In each drawing, a direction indicated by an arrow of three axes (X, Y, and Z) is a positive direction of each direction, and the opposite direction is a negative direction.

Figure 8:
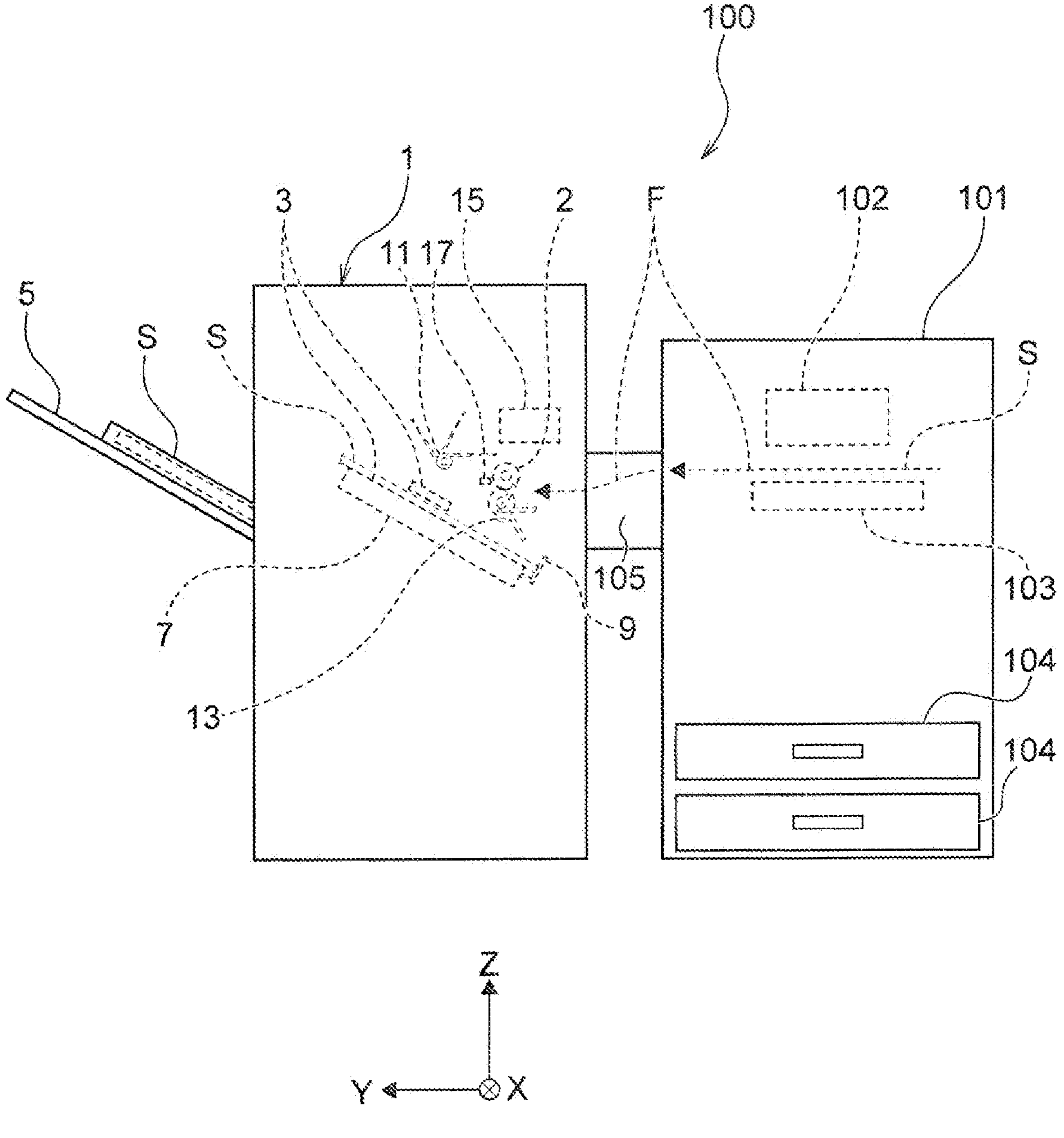
FIG. 8 is an external front view of a printing system according to the first exemplary embodiment.

As illustrated in FIG. 8, a printing system 100 according to the present exemplary embodiment includes a printing apparatus 101 and a post-processing device 1 to which a sheet S on which printing is performed by the printing apparatus 101 is fed through a communication unit 105. In FIG. 8, the reference numeral 102 denotes a print head that executes printing on the sheet S, the reference numeral 103 denotes a platen that supports a lower surface of the sheet S on which printing is performed, and the reference numeral 104 denotes a sheet stacker that stores the sheet S for printing in a feedable manner.

The post-processing device 1 includes a post-processing unit 3 that performs post-processing, which will be described later, and a discharged sheet receiving unit 5 to which the sheet S having passed through the post-processing unit 3 is discharged by a discharge unit (not illustrated). The discharged sheet receiving unit 5 receives the sheet S discharged through the post-processing unit 3 of the post-processing device 1, and is configured to receive the sheet S regardless of whether the post-processing is performed in the post-processing unit 3.

As illustrated in FIG. 1, the post-processing device 1 includes a loading unit 7 on which the sheet S fed is loaded, a first transport unit 11 that applies a transport force P1 to the sheet S loaded on the loading unit 7 toward an alignment unit 9, a second transport unit 13 located between the first transport unit 11 and the alignment unit 9 and applying a transport force P2 to the sheet S toward the alignment unit 9, a control unit 15 that controls rotation operation of the second transport unit 13, and the post-processing unit 3 that performs post-processing on the sheet S transported to the alignment unit 9. The sheet S fed from the printing apparatus 101 is transported in the transport direction F (+Y direction) via a transport roller pair 2 and placed at the loading unit 7.

The post-processing unit 3 can execute a plurality of types of post-processing to be described later. The control unit 15 is configured to control the rotation operation of the second transport unit 13 in accordance with the type of the post-processing. In FIG. 1, the reference numeral 12 denotes a transport path of a rear end of the sheet S.

First Transport Unit

The first transport unit 11 applies the transport force P1 to each sheet S loaded on the loading unit 7 toward the alignment unit 9, that is, in a direction (−Y direction) opposite to the transport direction F. The first transport unit 11 can be separated from the sheet loading surface of the loading unit 7 by a separation mechanism. The first transport unit 11 includes a shaft 4 and a first paddle 6 that is attached to the shaft 4, where the first paddle 6 rotates together with the shaft 4. The first paddle 6 is formed of a rubber material.

As the first paddle 6 rotates, the first transport unit 11 applies the transport force P1 to the sheet S toward the alignment unit 9, that is, in the −Y direction, and the rear end of each sheet S abuts against the alignment unit 9 and is aligned to the alignment unit 9.

Second Transport Unit

The second transport unit 13 is fixed and located between the first transport unit 11 and the alignment unit 9, and applies the transport force P2 to each sheet S loaded on the loading unit 7 toward the alignment unit 9. The second transport unit 13 includes a shaft 8 and a second paddle 10 that is attached to the shaft 8, where the second paddle 10 rotates together with the shaft 8. The second paddle 10 is also formed of a rubber material.

As the second paddle 10 rotates, the second transport unit 13 applies the transport force P2 to the sheet S toward the alignment unit 9 in cooperation with the first transport unit 11, and the rear end of each sheet S abuts against the alignment unit 9 and is aligned to the alignment unit 9.

The loading unit 7 includes a pair of edge guides (not illustrated) arranged in the X direction. The edge guides may be configured to move in the +X direction and −X direction. The interval between the edge guides can be widened or narrowed, and the edge guides are brought into contact with both side ends of the sheet S loaded on the loading unit 7 to align the sheet S in the width direction. The alignment unit 9 and the edge guides come into contact with the sheet S, whereby the rear end and the side end of the sheet S are aligned. As a result, the sheet S is aligned. The edge guides may also be used for the shift processing.

Post-Processing

In the present exemplary embodiment, the post-processing unit 3 performs post-processing on the sheet S transported to the alignment unit 9. In the present exemplary embodiment, the post-processing executed by the post-processing unit 3 is the rod stack processing, the shift processing, or the staple processing. The type of the post-processing unit 3 is not limited to the above three types.

The "rod stack processing" means a process of aligning the transported sheet S by the alignment unit 9 and sequentially stacking the sheet S on the loading unit 7 as they are. In addition, the "shift processing" means a process of shifting a bundle of a predetermined number of the aligned sheets S in the width direction (X-axis direction) to shift and position each bundle. In addition, the "staple processing" means a process of binding the bundle of the predetermined number of the aligned sheets S with a staple, and is a process having a stricter alignment standard than that of the rod stack processing or the shift processing.

In the post-processing, the sheet S loaded on the loading unit 7 is transported toward the alignment unit 9 by the first paddle 6 and the second paddle 10 and is brought into contact with the alignment unit 9. As a result, the side of the sheet S in contact with the alignment unit 9 is aligned with another sheet S, that is, the both sheets S are aligned. The alignment of the sheet S in the width direction (X-axis direction) is performed by moving the edge guides and bringing the edge guides into contact with both side ends of the sheet S.

In the shift processing, the bundle of the aligned sheets S is shifted in the width direction by the edge guides to be located while being shifted for each bundle. In the staple processing, the bundle of the aligned sheets S is bound by a stapling device.

The alignment standard is a standard for at least a deviation amount in the sheet transport direction with respect to a reference sheet alignment position. A state in which the deviation amount is small corresponds to a state in which the alignment standard is strict. The deviation amount in the sheet width direction may be included in the alignment standard. When the deviation amount is equal to or less than a predetermined amount, the post-processing quality is satisfied.

Control Unit

In the present exemplary embodiment, when the rod stack processing or the shift processing is selected, the control unit 15 is configured to be capable of reducing the rotation number in the rotation operation of the second paddle 10 provided in the second transport unit 13 less than the rotation number in a case of the staple processing. The type of the post-processing can be selected in advance by a user through a display panel (not illustrated), etc.

Here, "reduce" in "reduce a rotation number" is used in a meaning including not only literally reducing the rotation number but also setting the rotation number to 0. In other words, it is used in a meaning including not rotating the second transport unit 13.

First Example of Reducing the Rotation Number, i.e., to 0

As illustrated in FIG. 2, as a first example of reducing the rotation number, the control unit 15 has a table (B) in which the rotation number of the second transport unit 13 is set to 0 when the type of the post-processing is the rod stack processing or the shift processing. Specifically, the control unit 15 has a table (B) in addition to a table (A) for rotating both the first transport unit 11 and the second transport unit 13.

In the table (A), when the type of the post-processing is the rod stack processing or the shift processing, the rotation number of the second transport unit 13 is three in each case, whereas in the table (B), the rotation number of the second transport unit 13 is 0 in each case. In the case where the type of post-processing is staple processing, the rotation number of the second transport unit 13 is the same, four, for both table (A) and table (B). Since the rotation number of the first paddle 6 in the rod stack processing and the shift processing is smaller than that in the staple processing, this feature also corresponds to the wear.

When the rotation number of the second transport unit 13 is set to 0, the rotation is stopped in a state in which the second paddle 10 does not interfere with the transport path of the sheet S.

Second Example of Reducing the Rotation Number, i.e., to 0

Figure 3:
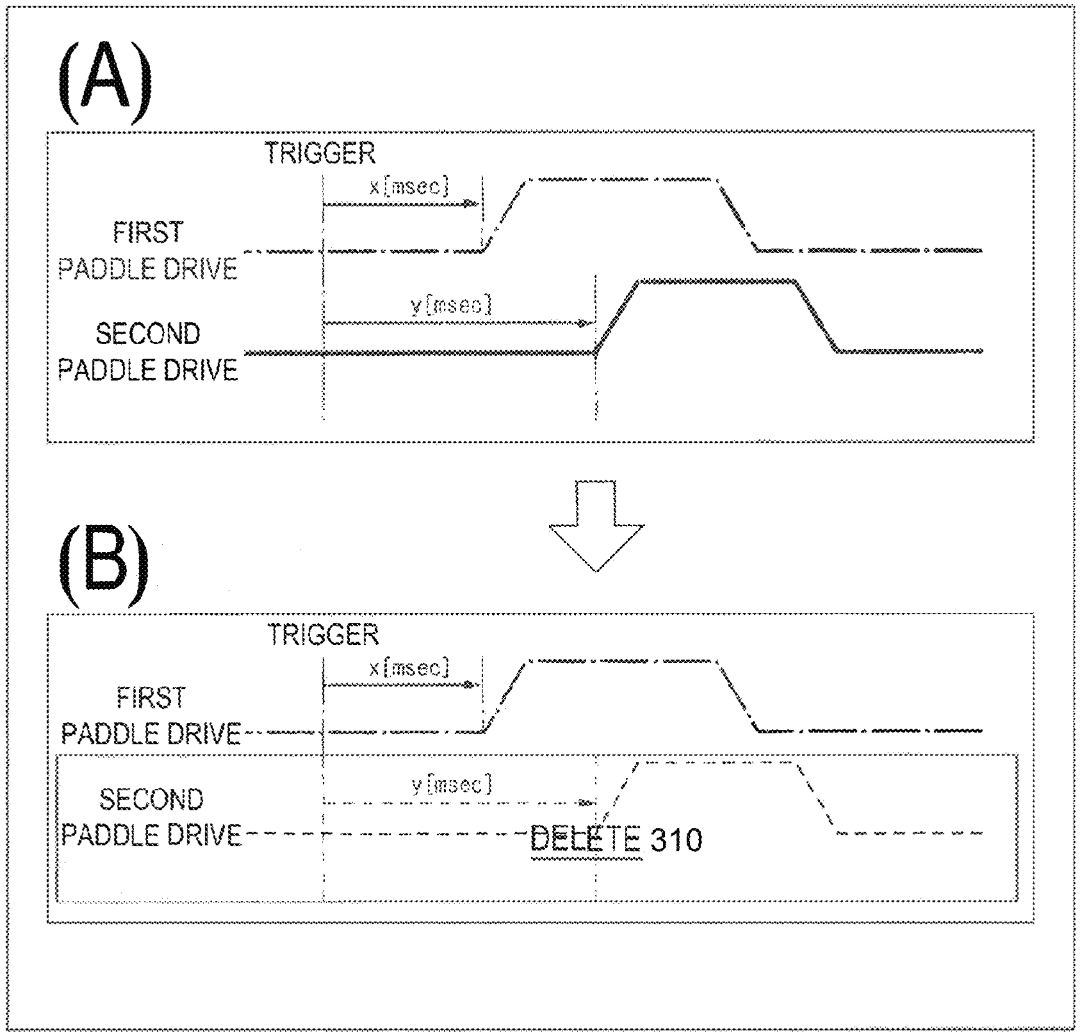
FIG. 3 is another example of a table used for rotation control of the second transport unit according to the first exemplary embodiment.

A second example of reducing the rotation number will be described with reference to FIG. 3. As illustrated in FIG. 3, the control unit 15 has a sequence (A) for rotating both the first transport unit 11 and the second transport unit 13.

In the case where the type of post-processing is the rod stack processing or the shift processing, the rotation number of the second transport unit 13 is reduced to 0 by deleting 310 a portion corresponding to the second transport unit 13 in the sequence (A) as shown in a sequence (B).

When the rotation number of the second transport unit 13 is set to 0, the rotation is stopped in a state in which the second paddle 10 does not interfere with the transport path of the sheet S.

Third Example of Reducing the Rotation Number, not to 0

As illustrated in FIG. 4, as a third example of reducing the rotation number, the control unit 15 has a table (B) for reducing the rotation number of the second transport unit 13 when the type of the post-processing is the rod stack processing or the shift processing. Specifically, the control unit 15 has a table (B) in addition to a table (A) for rotating both the first transport unit 11 and the second transport unit 13.

In the table (A), when the type of the post-processing is the rod stack processing or the shift processing, the rotation number of the second transport unit 13 is three in each case, whereas in the table (B), the rotation number of the second transport unit 13 is one in each case. In the case where the type of post-processing is staple processing, the rotation number of the second transport unit 13 is the same, four, for both table (A) and table (B).

In the present exemplary embodiment, as illustrated in FIG. 1, the post-processing device 1 includes a counting unit 17 that counts a total transport number C of the sheets S transported to the alignment unit 9. In the present exemplary embodiment, the counting unit 17 is configured by an optical sensor. However, in the control unit of the post-processing device 1, a configuration may be adopted in which counting is performed by software using sensing by another sensor that detects the passage of the sheet S from the first sheet at the start of use.

The wear of the second paddle 12 of the second transport unit 13 progresses due to continuous use. When the rotation number is uniform, the transport force P2 gradually decreases. The total transport number C of the sheets S counted by the counting unit 17 is information corresponding to the degree of wear due to the continuous use. Here, the "predetermined number" is set by performing a durability test in advance.

Further, in the present exemplary embodiment, when the rod stack processing or the shift processing is selected and the total transport number C is equal to or greater than the predetermined number, the control unit 15 is configured to be capable of increasing the rotation number in the rotation operation of the second transport unit 13 more than the rotation number in a case where the total transport number C is less than the predetermined number. A degree to which the rotation number is increased is set so that a decrease in the transport force P due to the wear can be compensated by performing a confirmation test in advance.

Case of Increasing Rotation Number Due to Wear

Figure 5:
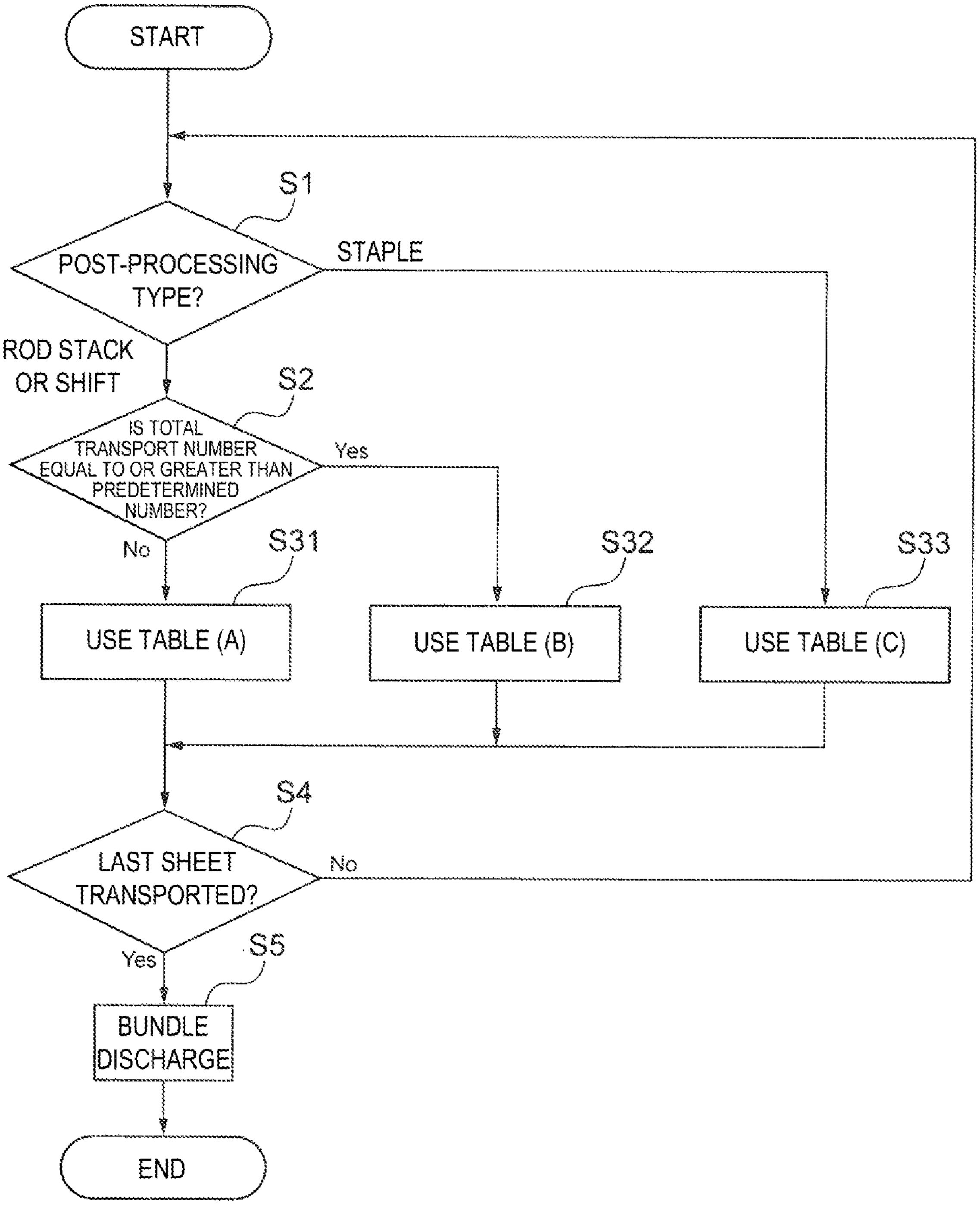
FIG. 5 is an example of a flowchart used for rotation control of the second transport unit according to the first exemplary embodiment.

As illustrated in the flowchart of FIG. 5, the type of post-processing is determined in step S1. When the rod stack processing or the shift processing is selected as the type of the post-processing, the process proceeds to step S2. In step S2, it is determined whether the total transport number C of the sheets S is equal to or greater than a predetermined number or smaller than the predetermined number.

When it is determined that the total transport number C is less than the predetermined number, the process proceeds to step S31. In step S31, the rotation operation of the first transport unit 11 and the second transport unit 13 is executed according to the table (A) illustrated in FIG. 6. Here, since the rotation number of the second transport unit 13 is 0, the sheet S is transported toward the alignment unit 9 only by the first transport unit 11.

When it is determined in step S2 that the total transport number C is equal to or greater than the predetermined number, that is, when the decrease in the transport force due to the abrasion has progressed to a degree that causes a problem, the process proceeds to step S32. In step S32, the rotation operation of the first transport unit 11 and the second transport unit 13 is executed according to the table (B) illustrated in FIG. 6. Here, since the rotation number of the second transport unit 13 is two, the first transport unit 11 and the second transport unit 13 cooperate to transport the sheet S toward the alignment unit 9.

If the staple processing is selected as the type of post-processing in step S1, the process proceeds to step S33. In step S33, the rotation operation of the first transport unit 11 and the second transport unit 13 is executed according to the table (C) illustrated in FIG. 6. Here, the rotation number of the second transport unit 13 is four in order to cope with the strictness of the alignment standard. Then, the first transport unit 11 and the second transport unit 13 cooperate to transport the sheet S toward the alignment unit 9.

Subsequently, in step S4, it is determined whether the last sheet S has been transported. If the determination is YES, the process proceeds to step S4 and ends. If the determination is NO, the process returns to step S1.

Further, in the post-processing device 1 of the present exemplary embodiment, the control unit 15 is configured to be capable of not performing the rotation operation of the second transport unit 13, when the rod stack processing or the shift processing is selected, the total transport number C is equal to or greater than the predetermined number, and at least one of the following (1) to (4) is satisfied:

(1) the basis weight of the sheet S is less than the predetermined amount;

(2) the size of the sheet S is smaller than the predetermined size;

(3) the humidity is lower than the predetermined value or the temperature is higher than the predetermined value; and (4) the printing density in a case where printing is performed on the sheet S is lower than the predetermined value.

Here, the "basis weight" refers to a weight (g) of a sheet of 1 m×1 m. The "printing density" is an ejection amount of ink ejected per unit area.

(1) Since the sheet S is light when the basis weight of the sheet S is less than a predetermined amount, the sheet S can be transported only by the first transport unit 11 without rotating the second transport unit 13. The "predetermined amount" is set depending on whether the sheet can be transported only by the first transport unit 11 without rotating the second transport unit 13. The "predetermined amount" is preferably set in multiple stages.

(2) Since the sheet S is light when the size of the sheet S is smaller than the predetermined size, the sheet S can be transported only by the first transport unit 11 without rotating the second transport unit 13. The "predetermined size" is set depending on whether the sheet can be transported only by the first transport unit 11 without rotating the second transport unit 13. The "predetermined size" is preferably set in multiple stages.

(3) Since the sheet S is dried when the humidity is lower than the predetermined value, the sheet can be transported only by the first transport unit 11 without rotating the second transport unit 13. The "predetermined value" is set depending on whether the sheet can be transported only by the first transport unit 11 without rotating the second transport unit 13. The "predetermined value" is preferably set in multiple stages.

Further, since the material of the first transport unit 11 and the second transport unit 13 is usually rubber, the material is hard to be cured and the transport forces P1 and P2 are not reduced when the temperature is higher than the predetermined value. Therefore, the sheet can be transported only by the first transport unit 11 without rotating the second transport unit 13. The "predetermined value" is set depending on whether the sheet can be transported only by the first transport unit 11 without rotating the second transport unit 13. The "predetermined value" is preferably set in multiple stages.

(4) When the printing density in a case where printing is performed on the sheet S is lower than the predetermined value, the friction between the sheets is small. Therefore, the sheet S can be transported only by the first transport unit 11 without rotating the second transport unit 13. The "predetermined value" is set depending on whether the sheet can be transported only by the first transport unit 11 without rotating the second transport unit 13. The "predetermined value" is preferably set in multiple stages.

An example of a case where at least one of (1) to (4) is satisfied.

FIG. 7 is an example of a table employed by the control unit 15 in a case where at least one of the above (1) to (4) is satisfied. When the rod stack processing or the shift processing is selected and the total transport number C is equal to or greater than the predetermined number, the rotation number of the second transport unit 13 is set according to the table in FIG. 7 as an example.

In the table of FIG. 7, the size of the sheet S is classified into four types, that is, one side is equal to or less than 297 mm, longer than 297 mm and equal to or less than 363 mm, longer than 363 mm and equal to or less than 432 mm, and longer than 432 mm. The printing density is classified into ten ranges of 0 to 10, 10 to 20, . . . , and 90 to 100. The temperature or humidity environment is classified into three types: environment A, environment B, and environment C. The basis weight is omitted here in order to avoid complication of the drawing.

Effect of Exemplary Embodiment (1) According to the present exemplary embodiment, the control unit 15 controls the rotation operation of the second transport unit 13 in accordance with the type of the post-processing. That is, it is possible to reduce a rotation number of the second transport unit 13 in accordance with the type of the post-processing. As a result, it is possible to suppress the progress of the wear in comparison with a case where the second transport unit 13 is uniformly rotated.

(2) In the present exemplary embodiment, the post-processing is the rod stack processing, the shift processing, or the staple processing. As the post-processing, the alignment standard is not strict in the rod stack processing and the shift processing, but the alignment standard is strict in the staple processing.

According to the present exemplary embodiment, since the control unit 15 controls the rotation operation of the second transport unit 13 in accordance with the type of the post-processing, such a post-processing device 1 capable of selecting and executing a plurality of types of post-processing has a great effect.

(3) According to the present exemplary embodiment, in a case where the rod stack processing or the shift processing in which the alignment standard is not strict is selected, it is possible to reduce the rotation number of the second transport unit 13 less than that in the staple processing in which the alignment standard is strict. Accordingly, it is possible to suppress the progress of wear of the second transport unit 13.

(4) In the present exemplary embodiment, since wear of the second transport unit 13 progresses due to continuous use, the transport force gradually decreases if the rotation number of the second transport unit 13 is uniform.

According to the present exemplary embodiment, in a case where the total transport number C is equal to or greater than the predetermined number, it is possible to cause the rotation number in the rotation operation of the second transport unit 13 to be greater than the rotation number in a case where the total transport number C is less than the predetermined number. By increasing the rotation number in this manner, it is possible to compensate for a decrease in the transport force due to the wear.

(5) According to the present exemplary embodiment, in a case where at least one of the following (1) to (4) is satisfied, it is possible not to perform the rotation operation of the second transport unit 13. Accordingly, it is possible to suppress the progress of wear of the second transport unit.

(1) The basis weight of the sheet is less than the predetermined amount.

(2) The size of the sheet is smaller than the predetermined size.

(3) The humidity is lower than the predetermined value or the temperature is higher than the predetermined value.

(4) The printing density in a case where printing is performed on the sheet is lower than the predetermined value.

(6) Further, in the present exemplary embodiment, since the first transport unit 11 can be separated from the sheet loading surface of the loading unit 7 by the separation mechanism, it is possible to suppress the progress of wear of the first transport unit 11. However, since the position of the second transport unit 13 is fixed with respect to the sheet loading surface, it is difficult to structurally suppress the progress of wear.

When the present disclosure is applied to the post-processing device 1 including such a second transport unit 13 whose position is fixed, the effect thereof is large.

(7) When the printing system 100 includes the discharged sheet receiving unit 5 for receiving the sheet S discharged through the post-processing unit 3 of the post-processing device 1 and the discharged sheet receiving unit 5 receives both of the sheet S subjected to the post-processing and the sheet S not subjected to the post-processing, the second transport unit 13 applies the transport force also to the sheet S not subjected to the post-processing. In the printing system 100 having such a structure, it is difficult to suppress the progress of wear of the second transport unit 13.

According to the present exemplary embodiment, since the post-processing device 1 to which the sheet S on which printing is performed by the printing apparatus 101 is fed is the post-processing device 1 having the above-described configuration, it is possible to suppress the progress of wear of the second transport unit 13.

Other Exemplary Embodiments

The post-processing device, the printing system, and the controlling method of the post-processing device according to the present disclosure are based on the configuration of the above-described exemplary embodiment. However, as a matter of course, modifications, omission, and the like may be made to a partial configuration without departing from the gist of the disclosure of the present application.

In the above-described exemplary embodiment, the case where the type of post-processing is the rod stack processing, the shift processing, or the staple processing has been described, but the present disclosure is not limited thereto. Examples of the other post-processing include punch processing. The punch processing can be controlled by the positioning as in the staple processing.

What is claimed is:

1. A post-processing device comprising:

a loading unit on which a sheet to be fed is loaded;

a first transport unit configured to apply, to the sheet loaded on the loading unit, a transport force toward an alignment unit;

a second transport unit located between the first transport unit and the alignment unit, and configured to apply, to the sheet, a transport force toward the alignment unit;

a control unit configured to control rotation operation of the second transport unit; and a post-processing unit configured to perform post-processing on the sheet transported to the alignment unit, wherein the post-processing unit is configured to execute a plurality of types of the post-processing, and the control unit is configured to control the rotation operation of the second transport unit in accordance with the type of the post-processing.

2. The post-processing device according to claim 1, wherein the post-processing is rod stack processing, shift processing, or staple processing.

3. The post-processing device according to claim 2, wherein the control unit is configured to, when the rod stack processing or the shift processing is selected, cause a rotation number in the rotation operation of the second transport unit to be less than the rotation number in a case of the staple processing.

4. The post-processing device according to claim 2, further comprising a counting unit configured to count a total transport number of sheets transported to the alignment unit, wherein the control unit is configured to, when the rod stack processing or the shift processing is selected and the total transport number is equal to or greater than a predetermined number, cause a rotation number in the rotation operation of the second transport unit to be greater than the rotation number in a case where the total transport number is less than the predetermined number.

5. The post-processing device according to claim 4, wherein the control unit is configured to not perform the rotation operation of the second transport unit, when the rod stack processing or the shift processing is selected, the total transport number is equal to or greater than the predetermined number, and at least one of the following (1) to (4) is satisfied:

(1) a basis weight of the sheet is less than a predetermined amount;

(2) a size of the sheet is smaller than a predetermined size;

(3) a humidity is lower than a predetermined value or a temperature is higher than a predetermined value; and (4) a printing density in a case where printing is performed on the sheet is lower than a predetermined value.

6. The post-processing device according to claim 1, wherein the first transport unit includes a separation mechanism configured to separate the first transport unit from a sheet loading surface of the loading unit, and a position of the second transport unit with respect to the sheet loading surface is fixed.

7. A printing system comprising:

a printing apparatus configured to perform printing on a sheet;

the post-processing device according to claim 1, to which the sheet on which printing is performed by the printing apparatus is fed, wherein the printing system includes a discharged sheet receiving unit configured to receive a sheet discharged through the post-processing unit of the post-processing device and receive both of a sheet subjected to the post-processing and a sheet not subjected to the post-processing.

8. A control method of a post-processing device including:

a loading unit on which a sheet to be fed is loaded;

a first transport unit, as a large paddle, configured to apply, to the sheet loaded on the loading unit, a transport force toward an alignment unit;

a second transport unit, as a small paddle, located between the first transport unit and the alignment unit, and configured to apply, to the sheet, a transport force toward the alignment unit;

a control unit configured to control rotation operation of the second transport unit; and a post-processing unit configured to perform post-processing on the sheet transported to the alignment unit and execute a plurality of types of post-processing, the method comprising switching a rotation number of the second transport unit in accordance with the type of the post-processing.

* * * * *